Jan. 28, 1964  L. H. CUTLER  3,119,909
FASTENER FOR SECURING A SWITCH TO A PANEL
Filed Sept. 9, 1960  2 Sheets-Sheet 1

Inventor:
Leon H. Cutler,
by Thomas A. Briody
Attorney.

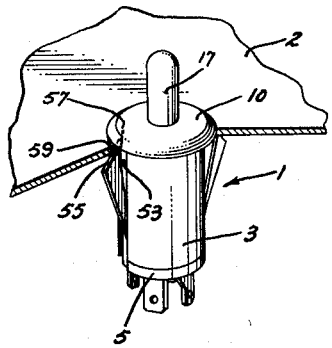
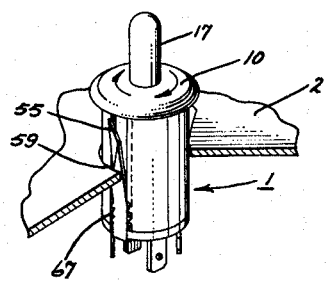
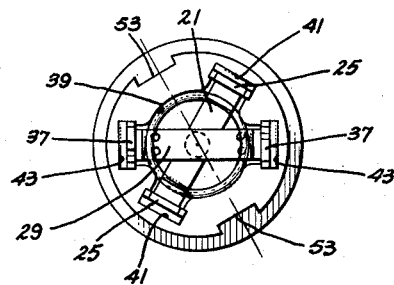
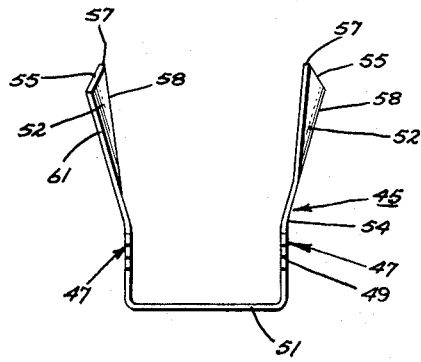
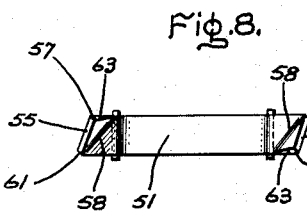
Inventor:
Leon H. Cutler,
by Thomas A. Briody
Attorney.

United States Patent Office 3,119,909
Patented Jan. 28, 1964

3,119,909
FASTENER FOR SECURING A SWITCH
TO A PANEL
Leon H. Cutler, New Haven, Conn., assignor to General
Electric Company, a corporation of New York
Filed Sept. 9, 1960, Ser. No. 55,054
8 Claims. (Cl. 200—61.82)

The present invention relates to a means for supporting and retaining wiring devices such as electrical switches and receptacles in a thin panel, and is particularly applicable to a fastening means for supporting and retaining a relatively diminutive electrical switch in a panel aperture.

For certain relatively small wiring devices such as electrical switches and receptacles of the prior art, it has often been found advantageous to provide these devices with an integral fastening means for removably and securely affixing them to a suitable support. One example of an electrical switch offering a ready application for an efficient fastening means of this type is the pushbutton operated "door" switches, which have been widely used in the prior art, in refrigerators, dryers, ovens, and the like, to control one of more circuits in response to the closing or opening of a door thereof. These switches are often mounted in an aperture of a supporting panel of the appliance and it is desirable that a convenient means be provided for efficiently fastening the switch to the panel, which means may also be readily unfastened to rapidly remove the switch from the panel in the event that the necessity arises.

It has therefore been found desirable to provide a new and improved fastening means for a wiring device which may be efficiently and conveniently installed in and removed from an aperture of a supporting panel. It is additionally desirable that such a fastening means be simple in structure, relatively inexepnsive to manufacture and assemble, and have a long life.

The primary object of this invention is to provide an improved fastening means which securely retains a wiring device in an aperture of a thin supporting panel and the like, such as is found in electrical appliances, and allows the device to be readily removed therefrom.

Another object of this invention is to provide an improved fastening means for a switch which permits the switch to be simply installed and removed from a supporting panel, yet holds it in a snugly seated relation within the panel when installed.

It is a further object of my invention to provide an improved fastening means for a relatively diminutive pushbutton switch which permits the switch to be simply and effectively mounted and removed from the front of a supporting panel and is at the same time relatively inexpensive to manufacture and assemble.

In carrying out my invention, in one form thereof, I provide a supporting means which includes a thin panel having a circular aperture formed therein. Within this aperture, I have removably mounted a pushbutton operated door switch which may be readily removed after it has been installed, from the front of the panel. To support and contain the switch elements, the switch includes a casing having a cylindrical portion of a lesser diameter than the aperture of the panel, and a flange formed in the front of the casing to seat against the periphery of the panel aperture. A U-shaped clamp is secured to the casing for removably retaining the casing in firmly seated position in the panel. This clamp has a pair of resilient arms which extend forwardly along opposite sides of the casing, and each of the arms has a resilient free end with a rearwardly and outwardly inclined diagonal front edge formed upon it. The free end edges of the arms have a lateral spacing generally beyond the periphery of the aperture when the arms are relaxed. The arms are also arranged to engage the peripheral edge of the aperture to flex the arms toward each other when the casing is inserted through the aperture to its seated position. When the switch is seated in the aperture, the inclined edges of the arms engage the peripheral edge of the aperture to clamp the casing rearwardly into a firmly seated position. When the casing of the switch is rotated within the circular aperture, the inclined edges of the arms are forced inwardly toward each other from their seated positions by coaction with the circular edge of the aperture to gradually disengage the inclined edges of the arms from the circular edge so that the casing may be conveniently withdrawn from the panel. An improved fastening means for a switch has thus been provided which allows the casing of the switch to be readily removed from its seated position in a supporting panel by the rotation and pulling of the switch casing from the front of the panel.

Further aspects of my invention will become apparent hereinafter and the specification concludes with claims particularly pointing out and distinctly claiming the subject matter which I regard as my invention. The invention, however, as to organization and method of operation, together with other objects and advantages thereof, may best be understood by reference to the following description when taken in conjunction with the accompanying drawings in which:

FIG. 4 is a perspective view of a switch and supporting panel embodying my invention, where the switch is in its seated position and the panel is broken away to show the whole switch;

FIG. 5 is a perspective view similar to FIG. 4, where the switch has been partially removed from its supporting panel;

FIG. 6 is a bottom view of the switch of my invention with the cover plate and clamp removed from the casing to show the interior structure of the switch;

FIG. 7 is an elevational view of the clamp of my invention; and

FIG. 8 is a top view of the clamp shown in FIG. 7.

Figure 1:
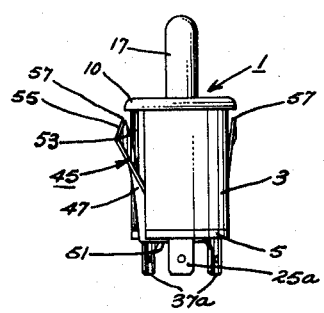
FIG. 1 is an elevational view of an improved pushbutton door switch embodying a part of my invention.

Referring to all of the figures, and initially in particular to FIGS. 1, 4, and 5, there is shown a pushbutton operated "door" switch 1 which is removably mounted in a supporting panel 2 by means of one form of my invention. Certain features of this switch, other than those claimed herein, are the invention of Philip Hutt, and are described in detail and claimed in the copending application of said Hutt, Serial Number 55,053 filed concurrently herewith and assigned to the same assignee as the present invention. This type of switch is relatively small in size and is often referred to as a "door" switch because it has seen widespread use in appliance applications where it is actuated by the movement of a door.

Figure 2:
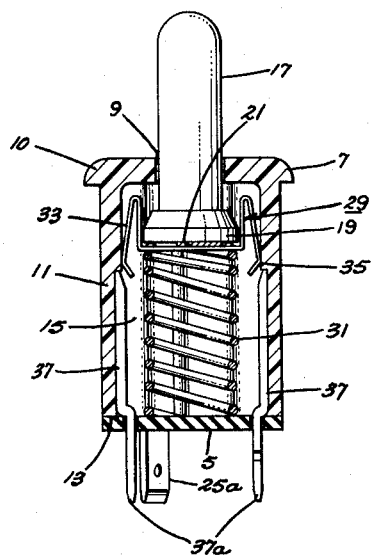
FIG. 2 is an enlarged cross-sectional elevation view showing the interior of the casing of the switch of FIG. 1.
Figure 3:
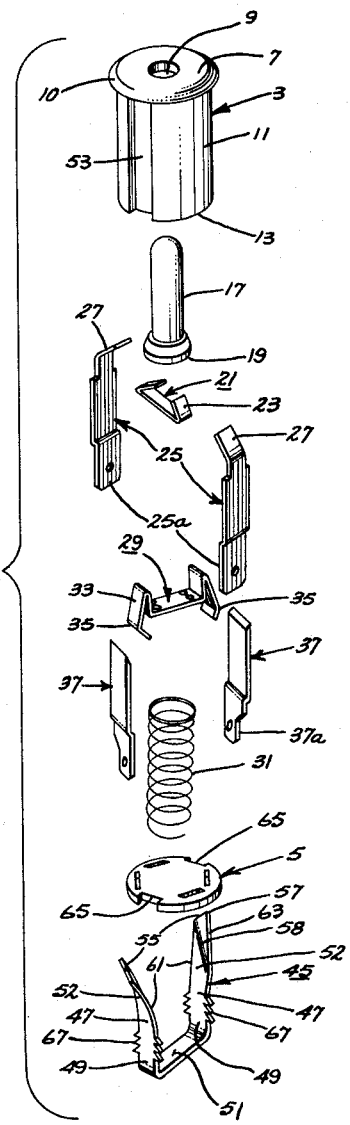
FIG. 3 is an exploded view showing in detail the individual parts which comprise the switch of this invention.

The switch 1 includes a hollow insulating base 3 which, for example, is formed of molded phenolic thermosetting plastic, and a flat generally round base plate 5 which is formed from a suitable insulating material. Plate 5 is securely mounted to base 3 to provide a casing or housing for switch 1 and also support the various parts thereof. Base 3 comprises top wall 7 having an aperture 9 formed in the center thereof, and an annular flange 10 formed on its outer periphery. (See FIG. 3.) From wall 7, body section 11 of the base extends perpendicularly downwardly (as shown in FIG. 3) to form cavity or recess 15. Body section 11 has a generally cylindrical outer configuration (FIG. 3) and an open bottom end 13 (FIG. 2). Cavity 15, which is formed by section 11, serves to contain and guide the movable contacts and actuating mechanism of the switch.

In FIG. 3 of the drawings, there is illustrated by way of an exploded view, the various parts of switch 1 and the manner whereby these parts are assembled within the base 3. Plunger 17 is cylindrically configured, extending through aperture 9 and having a flange 19 formed at its inner end. Movable bridging contact 21 is loosely attached to plunger 17, having a pair of inwardly angled contact arms 23 which extend around the plunger flange 19 so that the contact 21 reciprocates with the plunger. To electrically cooperate with bridging contact 21 and normally engage contact arms 23 thereof, fixed contacts 25 are positioned diametrically opposite each other and generally parallel to the axis of the base, in the interior wall of the casing. (See FIG. 6.) Contacts 25 have angled contact sections 27 which are disposed angularly inwardly above and normally engaged by (not shown) movable contact arms 23 to close a circuit connected through terminals 25a when plunger 17 is in its outer position (FIG. 2). These normally closed contacts become disengaged when the plunger is depressed.

To control a second circuit in response to the reciprocation of plunger 17, underneath movable contact 21, another movable bridging contact 29 is positioned in a crisscross manner. (See FIG. 6.) Movable contact 29 is wider and larger than contact 21 and is biased toward the flange of the plunger and movable contact 21 by coiled compression spring 31. Spring 31 also biases plunger 17 to its outermost position and thus controls the reciprocating movement thereof. Movable contact 29 has an inverted J-shaped spring section 33 formed on each of its ends, as shown in FIGS. 2 and 3. Spring sections 33 each include a V-shaped resilient contact portion 35 which is normally biased radially outwardly in a transverse direction. Contact 29 is normally open when plunger 17 is in its outer position (as shown in FIG. 2), and when the plunger is depressed, contact portions 35 engage the inner surfaces of fixed contacts 37 to close a circuit connected through terminals 37a. Fixed contacts 37 are positioned in the base recess 15, as shown in FIGS. 2 and 6, angularly with respect to fixed contacts 25, and are generally parallel to the axis of the base.

To enable base 3 to effectively contain the various switch parts with an optimum space utilization, cavity 15 includes a diametrically opposed pair of longitudinally extending cylindrical surfaces 39 and two pairs of angularly spaced and diametrically opposed longitudinally extending channels 41 and 43 (as shown in FIG. 6). The surfaces 39 and the channels 41 and 43 are formed in the inner walls of recess 15, with centers of each surface and channel spaced apart by approximately 60°. Surfaces 39 serve to guide the reciprocating movement of the plunger 17 and spring 31 within the cavity by their dimensional relationship with flange 19 and the spring. Channels 41 receive and position fixed contacts 25 and also guide bridging contact 21. Channels 43 receive and position fixed contacts 37 and also guide the bridging contact 29. The particular construction of the casing of switch 1 and the manner in which the switch parts are positioned and guided therein comprises the invention of Philip Hutt, and this construction and arrangement are described and claimed in his aforesaid copending application Serial Number 55,053.

Turning now to a very important aspect of my invention, which provides a new and improved means for removably mounting my switch in the aperture of a supporting panel, as shown in FIGS. 1, 4, and 5, it will be noted that the switch casing has a U-shaped clamp 45 attached thereto. Clamp 45 includes a pair of oppositely disposed resilient arms 47 with an intermediate connecting portion 51 joining these arms together. (See FIG. 3.)

Each of the arms 47 includes supporting section 49 which is connected to intermediate portion 51 and extends perpendicularly therefrom, and a resilient clamping section 52 which extends upwardly and transversely outwardly from the other end of each section 49, as shown in FIG. 7. Clamping sections 52 are each bent transversely outwardly from sections 49 at an acute angle at 54 (FIG. 7) and have diagonal front edges 55 which are sloped upwardly, as shown in FIG. 7, in divergent parallel directions. More particularly, edges 55 are disposed in parallel planes and extend in forwardly divergent directions. Between bend 54 and front edge point 57 of each clamping section 52, the resilient arm 47 is bent or twisted inwardly along diagonal crease 58 (FIG. 3) so that the diagonal front edges are rearwardly inclined, i.e., inclined or canted toward intermediate portion 51, and also outwardly inclined, i.e., inclined or canted from the center line of clamp 45 transversely outwardly therefrom. (See FIG. 8.)

Clamp 45 is attached to the casing of switch 1 so that the flat surface of intermediate connecting portion 51 underlies the outer surface of cover plate 5 in a diametrically extending fashion (not shown). The arms 47 of clamp 45 then extend generally upwardly, as shown in FIG. 1, or forwardly with respect to base flange 10, along opposite outer longitudinal sides of body section 11 of base 3. To guide the resilient arms and to fasten the various parts of the switch together within the casing, as shall be described hereinafter, a diametrically opposed pair of external channels 53 are extended longitudinally in the outer walls of body section 11. The edges 55 of the clamp 45 are thus inclined diagonally toward the extreme end points 57 of the arms in divergent parallel directions and positioned with respect to body section 11 so that each arm point 57 is disposed inwardly toward the axis of the switch. (See FIGS. 4 and 8.) With this arrangement of arms 47, the switch may be conveniently and removably positioned in circular aperture 59 of suitable supporting panel 2 from the front of the panel.

Turning now to an explanation of the improved manner whereby my clamp 45 removably mounts switch 1 in supporting panel 2, as shown in FIG. 1, when switch 1 is outside of the panel aperture, resilient arms 47 are relaxed and the front edges 55 thereof are laterally spaced apart by a dimension greater than the periphery of aperture 59 (FIG. 4). Switch 1 may then be inserted into circular aperture 59 of panel 2 from the front (i.e., above, as shown in FIG. 4) and securely seated in the panel by pushing. As switch 1 is being pressed into panel aperture 59, the peripheral edges of the aperture are engaged by outer longitudinal edge 61 of each clamping section 52 (FIGS. 3 and 8) to flex the sections 52 toward the axis of the casing. Inner longitudinal edges 63 of sections 52 (FIG. 8) are thus forced radially inwardly into external channels 53 (FIGS. 1 and 4) until just before the bottom side of base flange 10 seats itself against the upper periphery of the panel aperture. The free ends of the arms then snap slightly outwardly, and switch 1 is then in its supported position, as shown in FIG. 4, with front edges 55 each engaging the peripheral edge of the panel aperture to clamp the casing rearwardly into a firmly seated position.

When it is desired to remove switch 1 from the panel, the procedure for removal, by means of my invention, is both convenient and expedient. All that is required is the rotation of flange 10 in a clockwise direction, as shown in FIG. 5, and a slight outward pull to remove the switch from the panel. More particularly, as switch 1 is rotated in a clockwise direction (in FIGS. 4 and 5) and pulled outwardly, the circular edge of aperture 59 is engaged by front edge 55 of each arm 47, and the clamping sections of the arms are forced back into their channels and toward the axis of the casing. Clamping sections 52 thus become gradually disengaged from the peripheral edge of the aperture so that the switch may be easily withdrawn from the panel.

By means of my U-shaped clamp, and the manner whereby the resilient arms of this clamp cooperate with the circular aperture of a supporting panel, it will thus be seen by those skilled in the art that I have provided a novel and expedient fastening arrangement for removably mounting a wiring device such as my switch 1 in a panel. It will be further understood that with the fastening arrangement that I have illustrated, switch 1 may be conveniently inserted and removed from the front of the panel, and that it could also be removed from the rear of the panel if desired, by rotating the switch casing in the same direction (i.e., counterclockwise, facing the rear of the panel) and pushing it outwardly from the aperture 59 (FIG. 5).

To cooperate with base 3 of switch 1 and provide a housing for the various switch parts, as shown in FIG. 2, the open bottom end 13 of base 3 is closed by means of the round insulating cover plate 5. Plate 5 may be seen in FIG. 3 and it includes slots which are angularly spaced apart to receive the terminals of the fixed contacts of the switch, and diametrically opposed recesses 65 through which supporting sections 49 of clamp arms 47 are extended.

For efficiently attaching cover plate 5 to base 3, and thus thereby achieving a dual purpose for clamp 45, on each supporting section 49, there are formed oppositely disposed sets of sharp projections or barbs 67. The barbs 67 extend generally parallel to the plane of connecting section 51 from the side edges of sections 49. (See FIGS. 3 and 5.) When the U-shaped clamp is positioned on the switch housing, connecting portion 51 lies diametrically underneath cover plate 5 and the bottoms of supporting sections 49 extend through the peripheral recesses 65 of the plate into the oppositely disposed exterior channels 53. With the clamp positioned in this manner, the barbs press themselves into intimate engagement with the side walls of the channels 53, as illustrated in FIG. 5, to securely affix cover plate 5 to base 3. By means of forming the barbs 67 on the supporting sections 49 of the U-shaped clamp 45, there is provided an effective and simplified integral means for fastening the housing of switch 1 together. The particular construction of clamp 45 and channels 53 for attaching the base 3 and cover plate 5 of switch 1 together comprises the invention of Philip Hutt, and this construction and arrangement are described and claimed in his aforesaid copending application Serial Number 55,053.

In viewing FIG. 6, it will be noted that the center lines of exterior channels 53 are in radial alignment with the center lines of surfaces 39. This arrangement substantially enhances the space utilization of switch 1.

While in accordance with the patent statutes, I have described what at present is considered to be the preferred embodiment of my invention, it will be obvious to those skilled in the art that various changes and modifications may be made therein without departing from the invention, and I, therefore, aim in the following claims to cover all such equivalent variations as fall within the true spirit and scope of the invention.

What I claim as new and desire to secure by Letters Patent of the United States is:

1. Fastening means for a wiring device of the type which is mounted in a circular aperture of a thin panel and which includes a flange formed on the front of a casing thereof to seat against the periphery of the panel aperture, comprising a clamp for removably retaining said casing in firmly seated position in said panel, said clamp secured to said casing and including a plurality of resilient arms extending forwardly along associated sides of the casing, each of said arms having a resilient free end with a rearwardly and outwardly inclined diagonal front edge formed thereon, the free end edges of said arms having a lateral spacing generally beyond the periphery of the aperture when the arms are relaxed and said arms being arranged to engage the edges of said aperture to flex said arms toward the axis of said casing when the casing is inserted through said aperture to its seated position, said inclined edges of said arms being engageable with the peripheral edge of said aperture in the seated position of said flange thereby to clamp said casing rearwardly into a firmly seated position, said inclined edges of said arms being forced inwardly from their seated position by coaction with said circular edge upon rotation of the casing thereby to gradually disengage the inclined edges of the arms from the circular edge of the apertures so that the casing may be withdrawn from the panel, whereby said casing may be removed from its seated position in said panel by the rotation and pulling of said casing from the aperture of said panel.

2. A switch and a supporting means for removably mounting the switch thereto, comprising a thin supporting panel having a circular aperture formed therein, a casing for said switch having a cylindrical portion of lesser diameter than the aperture and a flange formed on the front thereof to seat against the periphery of the panel aperture, and a U-shaped clamp secured to said casing for removably retaining said casing in firmly seated position in said panel, said clamp having a pair of resilient arms extending forwardly along opposite sides of the casing, each of said arms having a resilient free end with a rearwardly and outwardly inclined diagonal front edge formed thereon, the free end edges of said arms having a lateral spacing generally beyond the periphery of the aperture when the arms are relaxed and said arms being arranged to engage the edges of said aperture to flex said arms toward each other when the casing is inserted through said aperture to its seated position, said inclined edges of said arms being engageable with the peripheral edge of said aperture in the seated position of said flange thereby to clamp said casing rearwardly into a firmly seated position, said inclined edges of said arms being forced inwardly from their seated position by coaction with said circular edge upon rotation of the casing thereby to gradually disengage the inclined edges of the arms from the circular edge of the aperture so that the casing may be withdrawn from the panel, whereby said casing may be removed from its seated position in said panel by the rotation and pulling of said casing from the aperture of said panel.

3. A switch and a supporting means for removably mounting the switch thereto, comprising a thin supporting panel having a circular aperture formed therein, a casing for said switch having a cylindrical portion of lesser diameter than the aperture and a flange formed on the front thereof to seat against the periphery of the panel aperture, contact means disposed within said casing, a plunger member extending into said casing and arranged to selectively actuate said contact means, and a U-shaped clamp secured to said casing for removably retaining said casing in firmly seated position in said panel, said clamp having a pair of resilient arms extending forwardly along opposite sides of the casing, each of said arms having a resilient free end with a rearwardly and outwardly inclined diagonal front edge formed thereon, the free end edges being canted so that they are disposed in parallel planes and extend in forwardly divergent directions, said edges also having a lateral spacing beyond the periphery of the aperture when the arms are relaxed with said arms being arranged to engage the edges of said aperture to flex said arms toward each other when the casing is inserted through said aperture to its seated position, said inclined edges of said arms being engageable with the peripheral edge of said aperture in the seated position of said flange thereby to clamp said casing rearwardly into a firmly seated position, said inclined edges of said arms being forced inwardly from their seated position by coaction with said circular edge upon rotation of the casing thereby to gradually disengage the inclined edges of the arms from the circular edge of the aperture so that the casing may be withdrawn from the panel, whereby said casing may be removed from its seated position in said panel by the rotation and pulling of said casing from the aperture of said panel.

4. A switch and a supporting means for removably mounting the switch thereto, comprising a thin supporting panel having a circular aperture formed therein, a casing for said switch having a cylindrical portion of lesser diameter than the aperture and a flange formed on the front thereof to seat against the periphery of the panel aperture, contact means disposed within said casing, a plunger member extending into said casing and arranged to selectively actuate said contact means, and a U-shaped clamp secured to said casing for removably retaining said casing in firmly seated position in said panel, said clamp having a pair of resilient arms extending forwardly along opposite sides of the casing, said casing having a diametrically opposed pair of longitudinally extending channels formed in the outer wall of the cylindrical portion thereof for receiving and guiding the arms of said clamp, each of said arms having a resilient free end with a rearwardly and outwardly inclined diagonal front edge formed thereon, the free end edges of the arms being canted so that they are disposed in parallel planes and extend in forwardly divergent directions, said edges also having a lateral spacing beyond the periphery of the aperture when the arms are relaxed with said arms being arranged to engage the edges of said aperture to flex said arms toward each other when the casing is inserted through said aperture to its seated position, said inclined edges of said arms being engageable with the peripheral edge of said aperture in the seated position of said flange thereby to clamp said casing rearwardly into a firmly seated position, said inclined edges of said arms being forced inwardly from their seated position by coaction with said circular edge upon rotation of the casing thereby to gradually disengage the inclined edges of the arms from the circular edge of the aperture so that the casing may be withdrawn from the panel, whereby said casing may be removed from its seated position in said panel by the rotation and pulling of said casing from the aperture of said panel.

5. A switch and a supporting means for removably mounting the switch thereto, comprising a thin supporting panel having a circular aperture formed therein, a casing for said switch having a cylindrical portion of lesser diameter than the aperture and a flange formed on the front thereof to seat against the periphery of the panel aperture, and a U-shaped clamp secured to said casing for removably retaining said casing in firmly seated position in said panel, said clamp having a connecting portion and a pair of resilient arms extending forwardly along opposite sides of the casing from said connecting portion, each of said arms having a plurality of transversely extending barbs formed thereon adjacent the connecting portion and a resilient free end with a rearwardly and outwardly inclined diagonal front edge formed thereon, said barbs arranged to engage recesses in the outer wall of said casing thereby to fasten the clamping member to the casing, the free end edges of said arms having a lateral spacing beyond the periphery of the aperture when the arms are relaxed with said arms being arranged to engage the edge of said aperture to flex said arms toward each other when the casing is inserted through said aperture to its seated position, said inclined edges of said arms being engageable with the peripheral edge of said aperture in the seated position of said flange thereby to clamp said casing rearwardly into a firmly seated position, said inclined edges of said arms being forced inwardly from their seated position by coaction with said circular edge upon rotation of the casing thereby to gradually disengage the inclined edges of the arms from the circular edge of the aperture so that the casing may be withdrawn from the panel, whereby said casing may be removed from its seated position in said panel by the rotation and pulling of said casing from the aperture of said panel.

6. A switch and a supporting means for removably mounting the switch thereto, comprising a thin supporting panel having a circular aperture formed therein, a casing for said switch having a cylindrical portion of lesser diameter than the aperture and a flange formed on the front thereof to seat against the periphery of the panel aperture, at least one pair of fixed contacts disposed within said casing, at least one movable bridging contact disposed within said casing and cooperating with said fixed contacts to form a circuit controlling contact means, a plunger extending axially through an end wall of said casing and arranged to selectively actuate said contacts, and a U-shaped clamp secured to said casing for removably retaining said casing in firmly seated position in said panel, said clamp having a pair of resilient arms extending forwardly along opposite sides of the casing, said casing having a diametrically opposed pair of longitudinally extending channels formed in the outer wall of the cylindrical portion thereof for receiving and guiding the arms of said clamp, each of said arms having a resilient free end with a rearwardly and outwardly inclined diagonal front edge formed thereon, the free end edges of the arms being canted so that they are disposed in parallel planes and extend in forwardly divergent directions, said edges also having a lateral spacing beyond the periphery of the aperture when the arms are relaxed with said arms being arranged to engage the edges of said aperture to flex said arms toward each other when the casing is inserted through said aperture to its seated position, said inclined edges of said arms being engageable with the peripheral edge of said aperture in the seated position of said flange thereby to clamp said casing rearwardly into a firmly seated position, said inclined edges of said arms being forced inwardly from their seated position by coaction with said circular edge upon rotation of the casing thereby to gradually disengage the inclined edges of the arms from the circular edge of the aperture so that the casing may be withdrawn from the panel, whereby said casing may be removed from its seated position in said panel by the rotation and pulling of said casing from the aperture of said panel.

7. A switch and a supporting means for removably mounting the switch thereto, comprising a thin supporting panel having a circular aperture formed therein, a casing for said switch having a cylindrical portion of lesser diameter than the aperture and a flange formed on the front thereof to seat against the periphery of the panel aperture, first and second pairs of fixed contacts disposed within said casing, first and second movable bridging contacts disposed in crisscross fashion within said casing and cooperating with said first and second pairs of fixed contacts respectively to form a means for controlling two circuits, a plunger extending axially through an end wall of said casing and arranged to selectively actuate the circuit controlling means, and a U-shaped clamp secured to said casing for removably retaining said casing in firmly seated position in said panel, said clamp having a pair of resilient arms extending forwardly along opposite sides of the casing, said casing having a diametrically opposed pair of longitudinally extending channels formed in the outer wall of the cylindrical portion thereof for receiving and guiding the arms of said clamp, each of said arms having a resilient free end with a rearwardly and outwardly inclined diagonal front edge formed thereon, the free end edges of the arms being canted so that they are disposed in parallel planes and extend in forwardly divergent directions, said edges also having a lateral spacing beyond the periphery of the aperture when the arms are relaxed, said arms being arranged to engage the edges of said aperture to flex said arms toward each other when the casing is inserted through said aperture to its seated position, said inclined edges of said arms being engageable with the peripheral edge of said aperture in the seated position of said flange thereby to clamp said casing rearwardly into a firmly seated position, said inclined edges of said arms being forced inwardly from their seated position by coaction with said circular edge upon rotation of the casing thereby to gradually disengage the inclined edges of the arms from the circular edge of the aperture so that the casing may be withdrawn from the panel, whereby said casing may be removed from its seated position in said panel by the rotation and pulling of said casing from the aperture of said panel.

8. A switch and a supporting means for removably mounting the switch thereto, comprising a thin supporting panel having a circular aperture formed therein, a hollow insulating base for said switch having a cylindrical portion of lesser diameter than the aperture and a flange formed on the front thereof to seat against the periphery of the panel aperture, a cover plate engaging the bottom end of said base thereby to form a housing for said switch, and a U-shaped clamp secured to said base for removably retaining said base in firmly seated position in said panel, said clamp having a connecting portion and a pair of resilient arms extending forwardly along opposite sides of the base from said connecting portion, each of said arms having a plurality of transversely extending barbs formed thereon adjacent the connecting portion and a resilient free end with a rearwardly and outwardly inclined diagonal front edge formed thereon, said barbs arranged to engage recesses in the outer wall of said base thereby to fasten the clamping member to the base, the connecting portion of said clamp extending across the outer surface of the cover plate thereby to fasten said plate to said base, the free end edges of said arms having a lateral spacing beyond the periphery of the aperture when the arms are relaxed with said arms being arranged to engage the edge of said aperture to flex said arms toward each other when the switch housing is inserted through said aperture to its seated position, said inclined edges of said arms being engageable with the peripheral edge of said aperture in the seated position of said flange thereby to clamp said switch housing rearwardly into a firmly seated position, said inclined edges of said arms being forced inwardly from their seated position by coaction with said circular edge upon rotation of the switch housing thereby to gradually disengage the inclined edges of the arms from the circular edge of the aperture so that the switch may be withdrawn from the panel, whereby said switch may be removed from its seated position in said panel by the rotation and pulling of said switch housing from the aperture of said panel.

References Cited in the file of this patent

UNITED STATES PATENTS

| 1,259,612 | Friedel | Mar. 19, 1918 |
| 1,702,396 | Andres | Feb. 19, 1929 |
| 2,031,453 | Benander | Feb. 18, 1936 |
| 2,049,747 | Parsons | Aug. 4, 1936 |
| 2,076,043 | Ryder | Apr. 6, 1937 |
| 2,244,978 | Tinnerman | June 10, 1941 |
| 2,605,374 | Batcheller | July 29, 1952 |
| 2,610,012 | Mackey et al. | Sept. 9, 1952 |
| 2,730,688 | Miller | Jan. 10, 1956 |
| 2,756,401 | Benander | June 24, 1956 |
| 2,814,697 | Hutt | Nov. 26, 1957 |
| 2,889,125 | Hart | June 2, 1959 |